United States Patent
Howard

(10) Patent No.: US 9,840,328 B2
(45) Date of Patent: Dec. 12, 2017

(54) UAS PLATFORMS FLYING CAPABILITIES BY CAPTURING TOP HUMAN PILOT SKILLS AND TACTICS

(71) Applicant: NORTHROP GRUMMAN SYSTEMS CORPORATION, Falls Church, VA (US)

(72) Inventor: Robert F. Howard, East Islip, NY (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 199 days.

(21) Appl. No.: 14/948,779

(22) Filed: Nov. 23, 2015

(65) Prior Publication Data

US 2017/0144755 A1 May 25, 2017

(51) Int. Cl.
*B64C 39/02* (2006.01)
*G06F 17/30* (2006.01)
*G08G 5/00* (2006.01)

(52) U.S. Cl.
CPC ...... *B64C 39/024* (2013.01); *G06F 17/30312* (2013.01); *B64C 2201/12* (2013.01); *B64C 2201/141* (2013.01); *G06F 17/30002* (2013.01); *G06F 17/30595* (2013.01); *G06F 17/30616* (2013.01)

(58) Field of Classification Search
CPC ............... G06F 17/30; G06F 17/30002; G06F 17/30286; G06F 17/30289; G06F 17/30292; G06F 17/30294; G06F 17/30297; G06F 17/30306; G06F 17/30309; G06F 17/30345; G06F 17/30371; G06F 17/30374; G06F 17/30595; G06F 17/30616; B64C 39/00; B64C 2201/00; B64C 2201/12; B64C 2201/121; B64C 2201/126; B64C 2201/14; B64C 2201/141; B64C 2201/22
See application file for complete search history.

(56) References Cited

U.S. PATENT DOCUMENTS 6,053,737 A 4/2000 Babbitt et al.
6,278,913 B1 8/2001 Jiang
(Continued)

OTHER PUBLICATIONS

Heinze et al., "Simulating Fighter Pilots," 2007, Defence Industry Applications of Autonomous Agents and Multi-Agent Systems, pp. 113-130, Birkhauser Bas.*
(Continued)

*Primary Examiner* — Thomas G Black
*Assistant Examiner* — Sara J Lewandroski
(74) *Attorney, Agent, or Firm* — John A. Miller; Miller IP Group, PLC

(57) ABSTRACT

A system and method for an unmanned combat system programmed with autonomous combat capabilities. The system and method include at least one unmanned combat vehicle and a computing subsystem that includes a database, the database storing interview data about combat experiences from a plurality of vehicle operators and recorded vehicle simulator data from simulations of vehicle operations performed by the plurality of vehicle operators, the computing subsystem being configured to program the interview data and the recorded vehicle simulator data stored in the database into the at least one unmanned combat vehicle.

17 Claims, 3 Drawing Sheets

(56) References Cited

U.S. PATENT DOCUMENTS

| | | | | |
|---|---|---|---|---|
| 6,498,968 | B1* | 12/2002 | Bush | G05B 13/048 701/1 |
| 6,658,980 | B1 | 12/2003 | Hayes et al. | |
| 7,132,961 | B2 | 11/2006 | Yannone et al. | |
| 7,330,844 | B2 | 2/2008 | Stoyen | |
| 7,949,295 | B2 | 5/2011 | Kumar et al. | |
| 8,892,274 | B2 | 11/2014 | Baudry | |
| 9,529,362 | B1* | 12/2016 | Bhattacharyya | B64C 13/18 |
| 9,545,995 | B1* | 1/2017 | Chau | B64C 13/06 |
| 2007/0016464 | A1* | 1/2007 | Yen | G06Q 10/00 705/301 |
| 2007/0156295 | A1* | 7/2007 | Stephane | G01C 23/00 701/1 |
| 2009/0234499 | A1* | 9/2009 | Nielsen | B25J 9/161 700/250 |
| 2010/0256961 | A1* | 10/2010 | Bush | G01C 23/00 703/8 |
| 2012/0078449 | A1 | 3/2012 | Hamblin et al. | |
| 2013/0218823 | A1 | 8/2013 | Ferrand | |
| 2015/0039161 | A1 | 2/2015 | Hastings et al. | |
| 2015/0079545 | A1 | 3/2015 | Kurtz | |
| 2015/0336671 | A1* | 11/2015 | Winn | B64C 39/024 701/3 |
| 2017/0108866 | A1* | 4/2017 | Quinn | G05D 1/0088 |

OTHER PUBLICATIONS

McIlroy et al., "Air Combat Tactics Implementation in the Smart Whole AiR Mission Model (SWARMM)," 1996, Air Operations Division, Aeronautical and Maritime Research Laboratory.*

Heinze et al., "Simulating Fighter Pilots," 2007, Defence Industry Applications of Autonomous Agents and Multi-Agent Systems, pp. 113-130, Birkhauser Basel.*

McIlroy et al., "Air defence operational analysis using the SWARMM model," 1997, pp. 195-218, Proceedings of the Asia Pacific Operations Research Symposium.*

Haider, Major Andre', "Remotely Piloted Aircraft Systems in Contested Environments: A Vulnerability Analysis", Joint Air Power Competence Centre, Sep. 2014, 136 pgs.

Federal Register, "Special Conditions: The Boeing Company, Models 737-700, -700C, -800, -900ER, -7, -8, and -9 Series Airplanes; Isolation or Airplane Electronic System Security Protection from Unauthorized Internal Access" A Rule by the Federal Aviation Administration, Jun. 6, 2014, 7 pgs.

Rao, Vijay D. et al. "A Neuro-Fuzzy Hybridization Approach to Model the Pilot Agent in Air Warfare Simulation Systems" Journal of Battlefield Technology, vol. 17, No. 1, 2014, pp. 23-30.

Barnes, Rex A. "Special Conditions: Boeing Model 777-200, -300, and -300ER Series Airplanes; Aircraft Electronic System Security Protection form Unauthorized Internal Access" Federal Register, vol. 78, No. 222, Nov. 18, 2013, Rules and Regulations, pp. 68985-68986.

Yanamura, KC, "Special Conditions: Gulfstream Model GVI Airplane; Electronic Systems Security Protection From Unauthorized External Access" Federal Register, vol. 76, No. 38, Feb. 25, 2011, Proposed Rules, pp. 10529-10530.

Federal Register, "Special Conditions: Boeing Model 747-8 Airplanes, Systems and Data Networks Security—Isolation or Protection From Unauthorized Passenger Domain Systems Access" Federal Register, vol. 75, No. 236, Dec. 9, 2010, pp. 76647-76648.

Kurnaz, Sefer et al. "Fuzzy Logic Based Approach to Design of Flight Control and Naviagation Tasks for Autonomous Unmanned Aerial Vehicles" Journal of Intelligent and Robotic Systems, vol. 54, Nos. 1-3, 229-244, 2008, pp. 229-244.

Dufrene, Warren R., Jr. "Application of Artificial Intelligence Techniques in Uninhabited Aerial Vehicle Flight" IEEE, 2003, pp. 8.C.3-1-8.C.3-6.

Andrievsky, Boris et al. "Combined Adaptive Autopilot for an UAV Flight Control" Proceedings of the 2002 IEEE International Conference on Control Applications, Glasgow, Scotland, U.K. IEEE 2002, pp. 290-291.

Li, Y. et al. "Neuro-Controller Design for Nonlinear Fighter Aircraft Maneuver Using Fully Tuned RBF Networks" Automatica, 37, 2001, pp. 1293-1301.

Johnson, W. Lewis, "Agents That Learn to Explain Themselves" AAAI-94 Proceedings, 1994, pp. 1257-1263.

\* cited by examiner

UAS PLATFORMS FLYING CAPABILITIES BY CAPTURING TOP HUMAN PILOT SKILLS AND TACTICS

BACKGROUND

Field

This invention relates generally to a system and method for expanding the flying capabilities of unmanned aerial systems and, more particularly, to a system and method that capture top human pilot skills and tactics in a database that is used to expand the flying capabilities of unmanned aerial systems to include offensive and defensive capabilities.

Discussion

Unmanned aerial systems (UASs), also known as unmanned aircraft systems or simply unmanned aerial vehicles (UAVs), come in a variety of shapes and sizes to serve diverse purposes that include governmental operations, non-governmental operations and hobby or recreational uses. The term UAV does not serve to describe the entire system that goes along with flying unmanned vehicles, hence the term UAS is used to describe the overall system. Known UASs are operated by one or more remote pilots and typically range in wingspan from less than six feet to more than 115 feet. While autonomous flights are known, i.e., flights that do not require a pilot or a remote pilot, these autonomous flights are limited to basic flights to and from a destination using built-in control systems that are capable of simple navigation and flight functions such as speed and flight path stabilization and waypoint following.

Known UASs require full-time GPS and/or a satellite communications link to fly, and thus must be in constant communication with a remote location and/or a remote pilot to operate. This requirement introduces the potential problem of the communications links being comprised, which may cause the UAS to fall into enemy hands and/or be turned against the original owner. For example, there have been reports that an anti-U.S. group spoofed a GPS signal being used by a U.S. surveillance UAS, the RQ-170, causing the unmanned aircraft to be hijacked into landing on a runway. While it is unclear what the facts are, it is known that current UASs are vulnerable to communications link losses for a variety of reasons. Thus, there is a need in the art for autonomous UASs that are capable of functioning without a communications link.

Armed attacks have been employed using UASs such as the MQ-1 Predator armed with Hellfire missiles. However, these UASs require one or more remote control pilots operating at a remote base station to survey one or more points of interest continuously and fire missiles under very specific conditions, such as adhering to Rules of Engagement (ROE), to hit a precise location and/or target with a high degree of accuracy. The use of UASs in lieu of manned aircraft for armed attacks provides the advantage of saving human lives and eliminating the possibility of a pilot being captured should the aircraft be shot down. However, known UASs that are capable of armed attacks, such as the MQ-1 Predator, have limited capabilities with respect to defending themselves should they be attacked from the air and/or the ground, and the aid of a remote pilot is of limited value in these circumstances, particularly if a communications link is lost. Thus, there is a further need in the art to develop a UAS that is capable of engaging in aerial flights and performing evasive maneuvers autonomously, i.e., without a remote pilot, to protect the UAS against attack from other aircraft and/or ground based attacks to ensure that the objective of the UAS may be completed and to provide an alternative to using manned aircraft for dangerous missions.

SUMMARY

A system and method for an unmanned combat system programmed with autonomous combat capabilities are disclosed. The system and method include at least one unmanned combat vehicle and a computing subsystem that includes a database, the database storing interview data about combat experiences from a plurality of vehicle operators and recorded vehicle simulator data from simulations of vehicle operations performed by the plurality of vehicle operators, the computing subsystem being configured to program the interview data and the recorded vehicle simulator data stored in the database into the at least one unmanned combat vehicle.

Additional features of the present invention will become apparent from the following description and appended claims, taken in conjunction with the accompanying drawings

DETAILED DESCRIPTION OF THE EMBODIMENTS

The following discussion of the embodiments of the invention directed to a system and method for creating an unmanned aerial system that is capable of autonomous fighting is merely exemplary in nature, and is in no way intended to limit the invention or its applications or uses. For example, while the system and method described herein use the example of unmanned aircraft, it is to be understood that a database may be created for any autonomous vehicle, including aircraft, space vehicles, trains, ships, submarines, tanks, robots, combat vehicles, etc., according to the system and method described herein.

Figure 1:
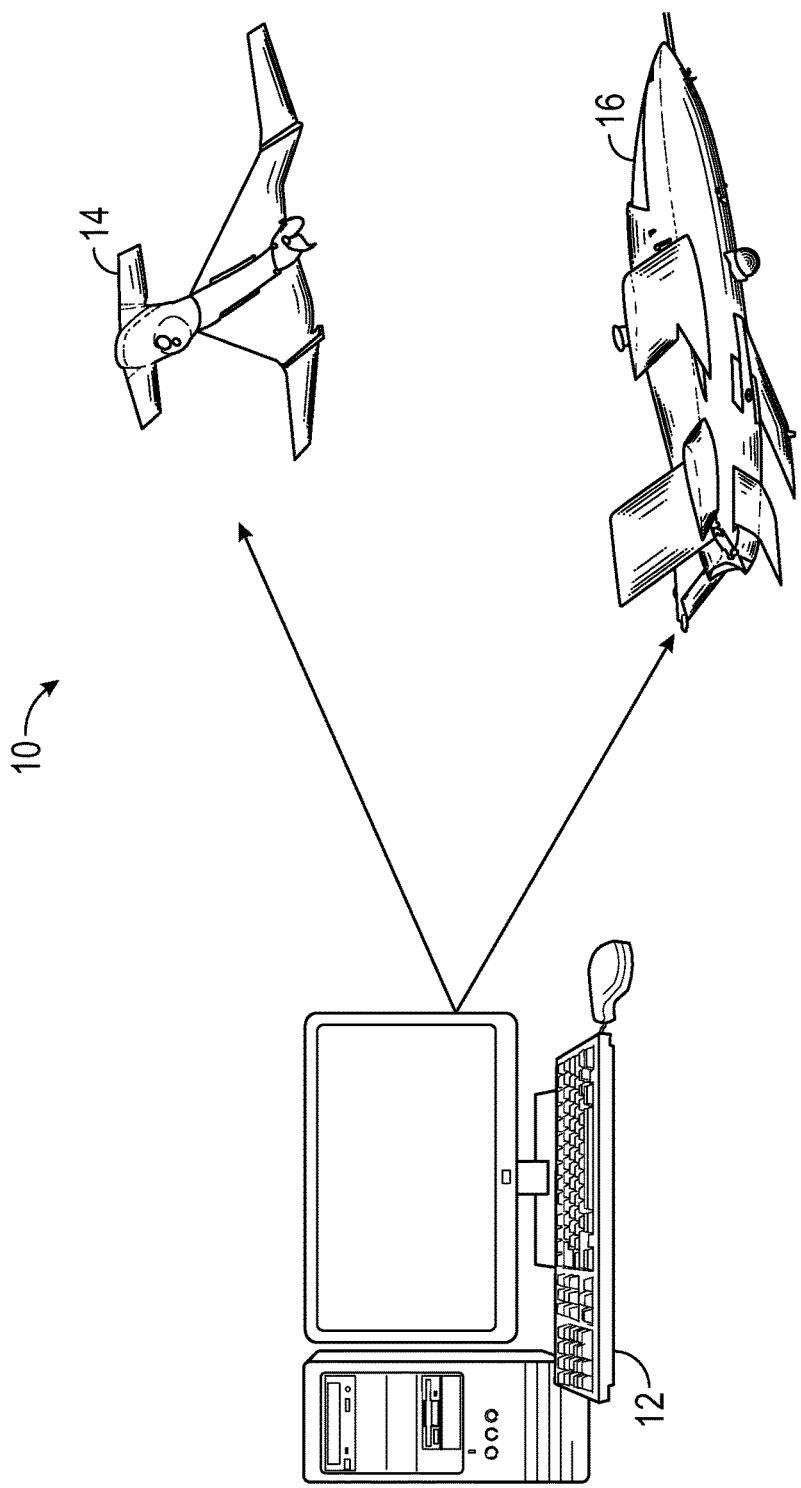
FIG. 1 is an illustration of an exemplary unmanned aerial system (UAS)

FIG. 1 is an illustration of an unmanned aerial system (UAS) 10 that provides unmanned aerial vehicles (UAVs) 14 and 16 with autonomous flying capabilities using a computing subsystem 12 that includes a database as described in more detail below. Various sensors and processors are part of the UAVs 14 and 16 that allow the UAVs 14 and 16 to understand their environment and what is going on around them such that the UAVs 14 and 16 can detect and monitor the movement of aircraft and other threats such as missiles around them. The processors and sensors on the UAVs 14 and 16 that monitor the surrounding environment include, for example, integrated situational awareness capabilities and aspects of stealth known to those skilled in the art. As set forth below, the computing subsystem 12 includes a database of information including fighter pilot skills as well as enhanced flight control laws and flight data from aircraft that have been used in combat, such as electronic bus flight data that is captured in real-time from aircraft using, for example, a system bus network, in a manner known to those skilled in the art, which may be retrieved from the aircraft upon landing or in real-time via a communications link. The data of the computing subsystem 12 enables the UAVs 14 and 16 to autonomously perform offensive and defensive tactics without the use of a pilot onboard or a remote pilot and without requiring a full-time communications link. After being programmed with data from the database of the computing subsystem 12, it is anticipated that the UAVs 14 and 16 will be capable of outperforming any aerial opponent encountered because the computing subsystem 12 programs the UAVs 14 and 16 with the data collected from the pilots, data collected from aircraft such as electronic bus flight data information from aircraft that have been in combat, and data collected from a flight simulator, and combines the data with the enhanced flight control laws that include the Rules of Engagement (ROE).

Data may be added to the computing subsystem 12 at any time, e.g., on a recurring or continuous basis, thus, as top skills of human pilots change so will the content of the computing subsystem 12 and subsequently the programming of the UAVs 14 and 16. The ROE included in the database of the computing subsystem 12 ensure that the UAVs 14 and 16 follow the rules, e.g., do not shoot down a commercial airliner, etc. Additionally, as UAV technology advances, the enhanced flight controls laws in the database of the computing subsystem 12 will be updated to reflect the technology advances in both manned and unmanned flights of real combat missions. Furthermore, as the UAVs 14 and 16 fly autonomously, data gathered from those missions may be collected using, for example, electronic bus flight data gathered from aircraft that have been in combat, and added to the database of the computing subsystem 12 to further enhance the flying capabilities of the UAVs 14 and 16. The UAS 10 may include built-in safe guards such as encryption and terminal wipe triggers to avoid reverse engineering or any other breach of security and/or technology that may cause the UAS 10 or the UAVs 14 and 16 to be compromised. For example, if the UAVs 14 and 16 are using GPS, the GPS signal will be matched against a navigation system, such as an initial guidance system, and GPS will not be relied upon if the GPS signal does not match the navigation system. This may require map comparisons or other technology to provide operations that do not require a communications link and that will allow the UAS 10 to complete a path to a target, identify the target, confirm the target and complete the mission.

Figure 2:
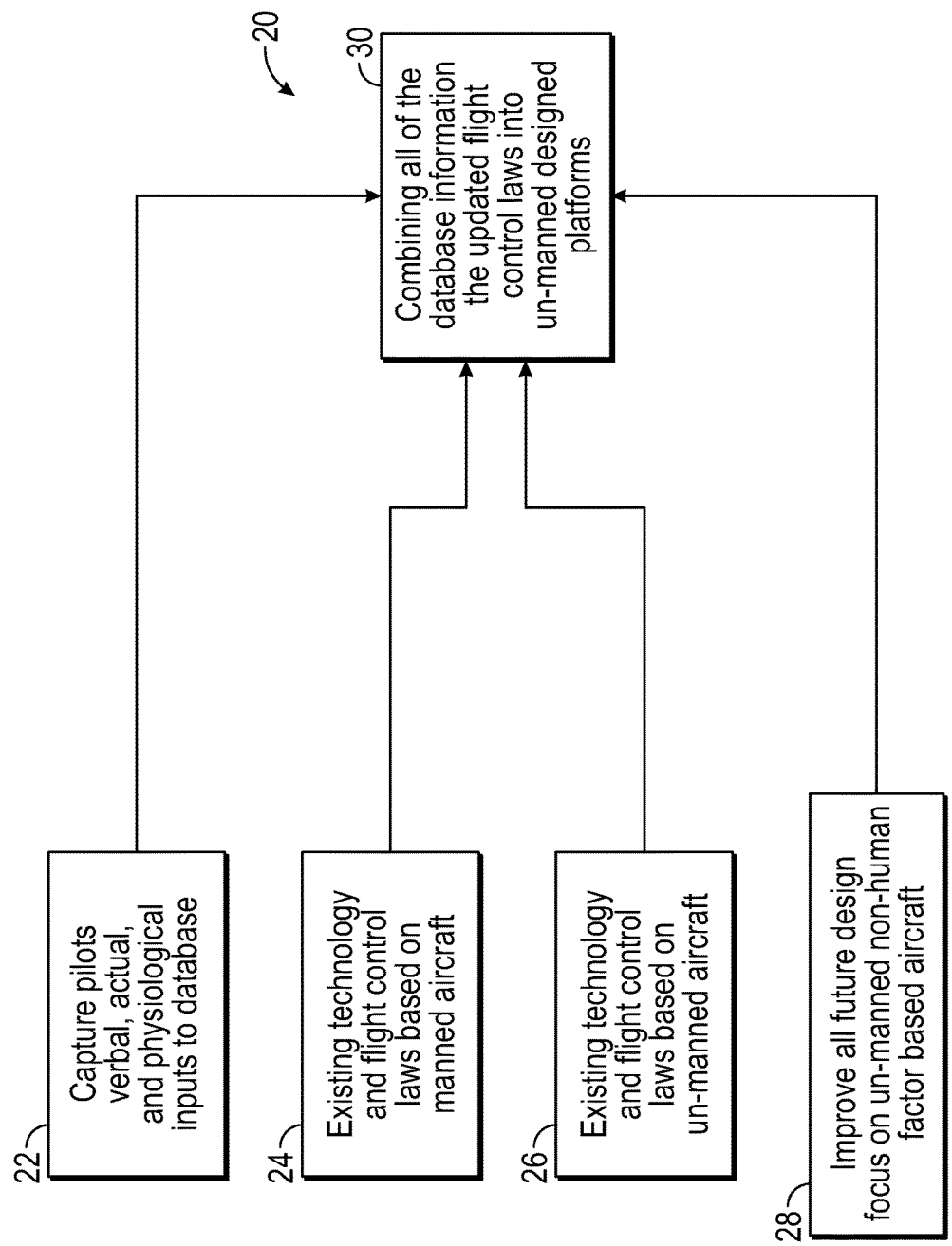
FIG. 2 is a flow chart diagram of an exemplary process for collecting data for a database of the UAS.

FIG. 2 is a flow diagram 20 illustrating an exemplary process for collecting data for the UAS 10. At box 22, fighter pilots are interviewed regarding their experiences, particularly their successful combat missions fighting against an enemy, and input data that includes verbal, mental and physiological data are collected for the database of the computing subsystem 12 that is based on the interviews. As will be described in detail below, the data collected from the pilot interviews is also used, in whole or in part, in a flight simulator that simulates one or more of the flights discussed during the interview process. In addition, actual combat flight data from electronic bus flight data of a manned aircraft, for example, that has experienced combat, may be included to ensure the accuracy and completeness of the data collected by the computing subsystem 12 to enable the most successful flights for the UAS 10. While fighter pilots for aircraft are used in this exemplary process, human skills operating any type of vehicle may be used to create an autonomous vehicle system as described herein.

The pilots interviewed at the box 22 may include, for example, the top 10-15% of all pilots among the United States Department of Defense, which includes the Air Force, Marines, Navy, etc. The goal is to interview those persons who are excellent pilots and that have combat experience. The pilots are not limited to current pilots as any pilot, former or current, that meets the desired criteria may be interviewed at the box 22. The purpose of the interview process is to gather data to create a simulated flight that is based on the pilot's combat experiences and to then capture the methods that the pilot used in their combat experience by recreating the combat experience flights in a flight simulator. While most pilots have a basic skill set that they have developed in their years of training and flying, it is anticipated that close encounters with enemies causes pilots to develop enhanced skills that allow them to win and succeed. Thus, the top pilots with combat experience are desired.

Existing technology and flight control law data based on manned aircraft is collected at box 24, and existing technology and flight control law data based on unmanned aircraft is collected at box 26. This data may also include electronic bus flight data that captures sensor inputs from actual flights flown by manned or unmanned aircraft. The existing technology and flight control data for both manned and unmanned aircraft also includes, for example, data regarding the type of aircraft, i.e., aircraft capabilities based on design. The data collected from the boxes 22, 24 and 26 is combined to create a database of information at box 30 that is part of the computing subsystem 12. The flight control laws are modified/updated at the box 30 by the computing subsystem 12 to remove any limitations that are due to a human factor, i.e., any human physiological limitations are removed. Thus, it is expected that the UAVs 14 and 16 will perform better than any manned aircraft. For example, the various G forces that the UAVs 14 and 16 can withstand may be greater than what the human body can tolerate, thereby enhancing the performance of the UAS 10 and the UAVs 14 and 16 associated therewith such that any manned aircraft opponent will be overcome. Adding to the performance of the enhanced flight control laws of the UAS 10 is the knowledge and skills of the interviewed fighter pilots and the data collected from their simulated flights as well as data from an aircraft that has been used in combat, such as electronic bus flight data as set forth above, thereby creating a UAS 10 with fighting capabilities that are beyond compare, as the UAVs 14 and 16 may anticipate not only a next move of an adversary, but the next few moves by comparing known moves in the database.

As future aircraft designs focus on unmanned aircraft, the technology and flight control data is collected at box 28 and added to the database of the computing subsystem 12 at the box 30 to update the database as needed. Additionally, The UAVs 14 and 16 may be tested against manned aircraft in mock combat scenarios to test and further enhance the database of the computing subsystem 12 and thus the performance of the UAS 10.

Figure 3:
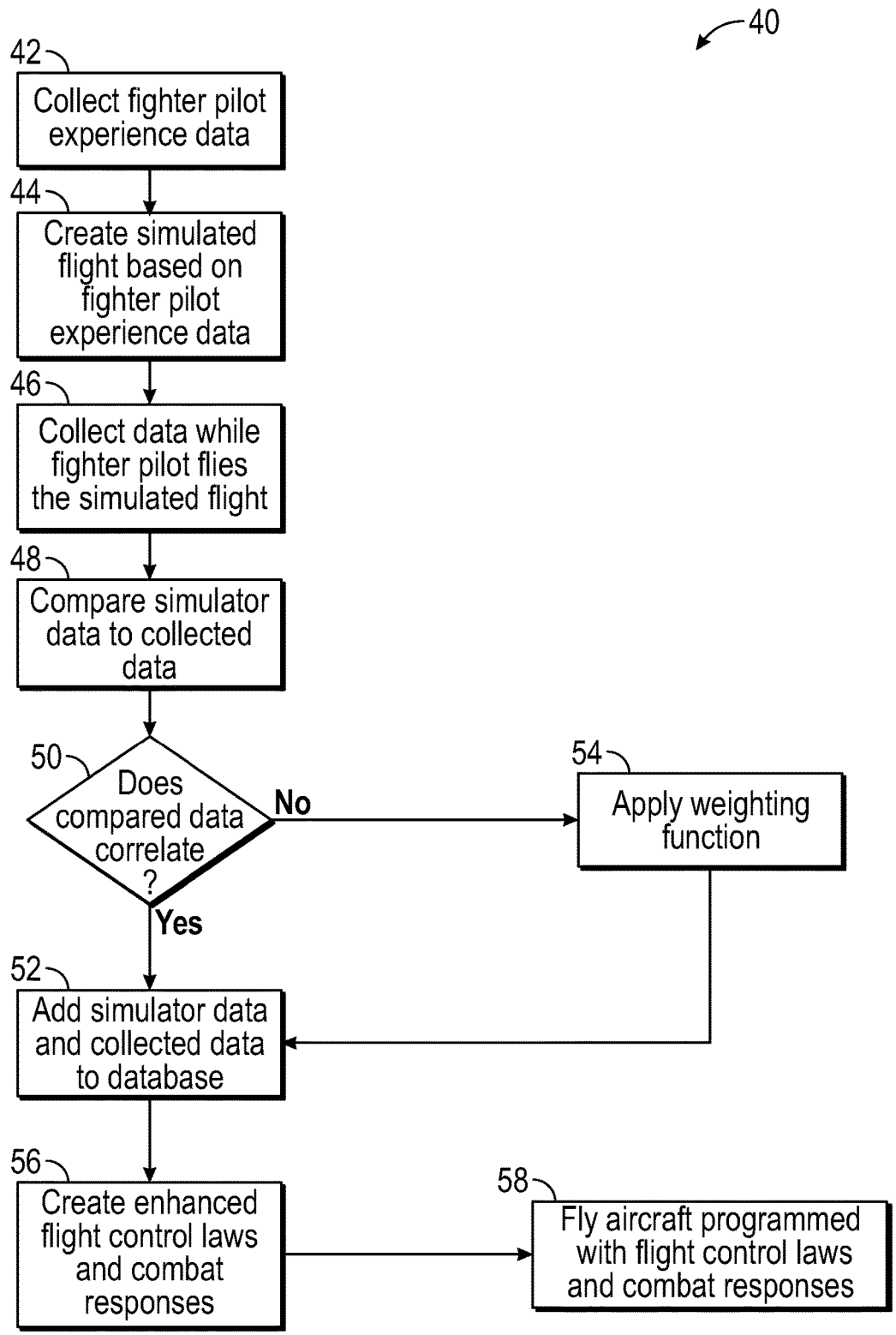
FIG. 3 is a flow chart diagram of an exemplary process for collecting and utilizing data for the UAS.

FIG. 3 is a flow chart diagram 40 illustrating an exemplary process for collecting and utilizing the data described in FIG. 2. At box 42, fighter pilot data is collected by interviewing top fighter pilots. The information gathered during the interview process at the box 42 is used at box 44 to create one or more simulated flights using a flight simulator. As stated above, a simulated flight may be created that reenacts an experience of a fighter pilot that was discussed during the interview process at the box 42. The interviewed pilots fly the simulated flights at box 46, where sensor data of all of the various inputs of the simulator, including signals from the pilot's minds to the simulated aircraft control surfaces, weapons and engines, and the pilot's physiological signs, are collected to capture the actual skills and decisions made by the pilot during the simulation. A pilot may fly a simulated flight that is based on his or her own flight experience, or may fly a simulated flight based on another pilot's flight experience. Any number of simulated flights may be flown by the pilots interviewed.

When the pilots relive their battle experiences in the flight simulator, the specific inputs of aircraft controls/operations are captured by sensors of the flight simulator, using, for example, electronic bus flight data, as well as the physiological signs of the pilot, and the data collected from the sensors at the box 46 is compared to the interview data to determine the accuracy of the interview data at box 48, as a pilot may not remember exactly how their previous successful missions were executed. A pilot's physiological signs recorded at the box 46 are used to determine the pilot's physiological state to determine whether the pilot is operating at his or her best standard or appears to be tired, distracted, etc. Electronic bus data that is captured from manned aircraft that have experienced combat may also be included at the box 42 and compared to the data collected from the simulator at the box 46 to determine if the pilot is operating at his or her best during the simulated flight.

At decision diamond 50, it is determined whether the skills and decisions collected using the sensors during the flight simulations at box 46 correlate to the interview data collected at the box 42. If the compared data from the boxes 42 and 46 correlate to each other at the decision diamond 50, the data from the boxes 42 and 46 is added to the database of the computing subsystem 12 at box 52. If not, a weighting function is applied to the data that from the boxes 42 and 46 that does not correlate to each other at box 54, where the weighting function operates to apply the weighting function to prioritize the data in the database such that the best data may be used by the UAVs 14 and 16. A weighting function may also be applied to the simulator data collected at the box 46 if the pilot's physiological signs suggest that the pilot was not operating at his or her best standard during the simulation. These examples of applying a weighting function are merely exemplary, as a weighting function may be applied in a variety of ways to organize and prioritize the data to ensure that the UAVs 14 and 16 are able to select the best decisions among the data. The data collected from the boxes 42 and 46 with the appropriate weighting function of the box 54 is added to the database of the computing subsystem 12 at the box 52. All of the data and the weighting functions are woven together at the box 52 by the computing subsystem 12 to create a sensor enhanced collection of reactions that the UAVs 14 and 16 may utilize.

Next, the data added to the database at the box 52 is combined with the enhanced flight control laws in the database of the computing subsystem 12 at box 56. The combat decisions, skills/responses data and the enhanced flight control laws are programmed into the UAVs 14 and 16 at box 58 using the computing subsystem 12. Once programmed with the enhanced flight control rules and combat responses, the UAVs 14 and 16 are able to fight their way to and from any target autonomously. In addition to fighting against manned and unmanned aircraft and other vehicles, the UAVs 14 and 16 may also be capable of evading/fighting against missiles, etc. As stated above, various sensors and processor of the UAVs 14 and 16 allow for the UAVs 14 and 16 to assess their environment and determine when a combat decision may be made. When making a combat decision, the UAVs 14 and 16 are able to take into account all of the weighted data of the group of skilled fighter pilots that were interviewed and use the enhanced flight control laws to execute their decision.

By providing the programming described above, the full time need for manned control, GPS and/or satellite communications may be reduced or eliminated. This in turn reduces or eliminates the concern that the signals will be jammed or spoofed. As time and technology advances, updates may come not only from manned fighter pilot experiences but also combat experiences of the UAVs 14 and 16 as collected via, for example, the electronic bus as bus data. Additionally, a fleet of UASs 10 may be built and operated that are in communication with each other such that they can learn from the experiences of each other and update the databases of the computing subsystems 12 associated with the various UASs 10 in real-time or near real-time. As new aircraft are designed without the limitations of the manned requirements, it is anticipated that aircraft will be developed that perform at or near aerodynamic limits to provide optimal performance. An added benefit to the UAS 10 described above is that they may be cheaper to manufacture because they no longer have to support a human pilot on board, i.e., no more ejection seats, onboard oxygen creation systems, no crew seats/stations, etc.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An unmanned aerial system programmed with autonomous combat capabilities, said system comprising:
at least one unmanned aerial vehicle; and
a computing subsystem including a database, said database storing interview data about combat experiences from a plurality of aircraft fighter pilots, recorded flight simulator data from simulated flights flown in a simulator by the plurality of fighter pilots, electronic bus flight data collected from an aircraft that has been in combat, and flight control laws for the unmanned aerial system that do not consider physiological limitations of a human body, wherein the computing subsystem is configured to program the interview data, the electronic bus flight data, the recorded flight simulator data and the flight control laws stored in the database into the at least one unmanned aerial vehicle to autonomously control the at least one unmanned aerial vehicle, and wherein the computing subsystem is further configured to compare the interview data and the electronic bus flight data to the recorded flight simulator data to determine if the interview data and the recorded flight simulator data correlate and store the interview data and the recorded flight simulator data which correlate in the database, and wherein the recorded flight simulator data includes signals from the mind of a pilot in the simulator, and flight simulator sensor inputs that include control surfaces, weapons, engines, and pilot physiological signs.

2. The system according to claim 1 wherein the at least one unmanned aerial vehicle is a plurality of unmanned aerial vehicles.

3. The system according to claim 1 wherein the computing subsystem is further configured to apply a weighting function to the interview data, the electronic bus flight data, and the recorded flight simulator data that does not correlate to organize the data that is programmed into the at least one unmanned aerial vehicle.

4. The system according to claim 1 wherein the at least one unmanned aerial vehicle does not require full time GPS or satellite communications to operate.

5. The system according to claim 1 wherein the computing subsystem updates the programming of the at least one unmanned aerial vehicle periodically.

6. The system according to claim 1 wherein the computing subsystem is further configured to record combat experience data of the at least one unmanned aerial vehicle of the unmanned aerial system and add the recorded combat experience data to the database of the computing subsystem such that the at least one unmanned aerial vehicle may be programmed with the recorded combat experience data from other unmanned aerial vehicles of other unmanned aerial systems.

7. A method for creating an autonomous unmanned aerial system with combat capabilities, said method comprising:
  interviewing a plurality of fighter pilots about their combat experience as a pilot;
  storing the interview data in a database;
  using the stored interview data to create a plurality of simulated flights that are recreations of the experiences of the plurality of fighter pilots;
  recording flight simulator data while each of the plurality of fighter pilots perform at least one simulated flight in a simulator, wherein the recorded flight simulator data is stored in the database;
  creating flight control laws for the unmanned aerial system that do not consider physiological limitations of a human body, wherein the created flight control laws are stored in the database;
  comparing the stored interview data to the recorded flight simulator data to determine if the stored interview data and the recorded flight simulator data correlate and storing the interview data and the recorded flight simulator data which correlate in the database, wherein recording the flight simulator data includes signals from the mind of the pilot in the simulator, and flight simulator sensor inputs that include control surfaces, weapons, engines, and pilot physiological signs;
  programming the interview data, the recorded flight simulator data and the created flight control laws that are stored in the database into at least one unmanned aerial vehicle; and
  using the interview data, the recorded flight simulator data and the created flight control laws to autonomously control the at least one unmanned aerial vehicle.

8. The method according to claim 7 further comprising recording combat experience data of the at least one unmanned aerial vehicle and adding recorded combat experience data to the database such that the at least one unmanned aerial vehicle may use the information and learn from other unmanned aerial vehicles of other unmanned aerial systems.

9. The method according to claim 7 wherein the at least one unmanned aerial vehicle is a plurality of unmanned aerial vehicles.

10. The method according to claim 7 further comprising applying a weighting function to the stored interview data and the recorded flight simulator data that does not correlate to organize the data that is programmed into the at least one unmanned aerial vehicle.

11. The method according to claim 7 wherein the at least one unmanned aerial vehicle does not require full time GPS or satellite communications to operate.

12. The method according to claim 7 further comprising periodically updating the programming of the at least one unmanned aerial vehicle.

13. An unmanned combat system programmed with autonomous combat capabilities, said system comprising:
  at least one unmanned combat vehicle; and
  a computing subsystem including a database, said database storing interview data about combat experiences from a plurality of vehicle operators and recorded vehicle simulator data from simulations of vehicle operations performed in a simulator by the plurality of vehicle operators, said computing subsystem being configured to program the interview data and the recorded vehicle simulator data stored in the database into the at least one unmanned combat vehicle to autonomously control the at least one unmanned combat vehicle, wherein the computing subsystem is further configured to compare the interview data to the recorded vehicle simulator data to determine if the interview data and the recorded vehicle simulator data correlate and store the interview data and the recorded vehicle simulator data which correlate in the database, and wherein the recorded vehicle simulator data includes signals from the mind of a vehicle operator in the simulator, and simulator inputs that include control surfaces, weapons, engines and operator physiological signs.

14. The system according to claim 13 wherein the at least one unmanned combat vehicle is a plurality of unmanned combat vehicles.

15. The system according to claim 13 wherein the at least one unmanned combat vehicle does not require full time GPS or satellite communications to operate.

16. The system according to claim 13 wherein the computing subsystem is further configured to record combat experience data of the at least one unmanned combat vehicle and add the recorded combat experience data to the database of the computing subsystem such that the unmanned combat vehicle may be programmed with the recorded combat experience data from a different unmanned combat vehicle.

17. The system according to claim 13 wherein the computing subsystem is further configured to apply a weighting function to the interview data and the recorded vehicle simulator data that does not correlate to prioritize the data programmed into the at least one unmanned combat vehicle.

* * * * *